United States Patent [19]
Tsujimoto et al.

[11] Patent Number: 5,335,359
[45] Date of Patent: Aug. 2, 1994

[54] DIVERSITY RECEIVER USING MATCHED FILTER AND DECISION FEEDBACK EQUALIZER

[75] Inventors: Ichiro Tsujimoto; Yoshiyuki Fujimoto, both of Tokyo, Japan

[73] Assignee: NEC Corporation, Tokyo, Japan

[21] Appl. No.: 707,120

[22] Filed: May 30, 1991

[30] Foreign Application Priority Data

| May 31, 1990 [JP] | Japan | 2-142238 |
| May 31, 1990 [JP] | Japan | 2-142239 |
| Oct. 25, 1990 [JP] | Japan | 2-289721 |

[51] Int. Cl.$^5$ .................................... H04B 17/02
[52] U.S. Cl. ................................. 455/52.3; 455/65; 455/136; 455/138; 455/140; 375/100
[58] Field of Search .............. 455/52.3, 67.6, 65, 455/70, 132, 133, 136, 138, 140, 101; 375/40, 100

[56] References Cited

U.S. PATENT DOCUMENTS

| 3,195,048 | 7/1965 | Adams et al. | 455/101 |
| 3,835,392 | 9/1974 | Mahner et al. | 455/138 |
| 4,849,990 | 7/1989 | Ikegami et al. | 375/40 |
| 5,127,025 | 6/1992 | Okanoue | 375/100 |

FOREIGN PATENT DOCUMENTS

| 0015341 | 1/1983 | Japan | 455/101 |
| 0286027 | 11/1988 | Japan | 455/65 |
| 9107829 | 5/1991 | PCT Int'l Appl. | 375/100 |

OTHER PUBLICATIONS

Watanabe, "Adaptive Matched Filter and its Significance to Anti-Multipath Fading", IEEE, CH2314-3/86/0000-1455, 1986, pp. 1455-1459.

Primary Examiner—Reinhard J. Eisenzopf
Assistant Examiner—Andrew Faile
Attorney, Agent, or Firm—Foley & Lardner

[57] ABSTRACT

In a digital radio communications system, a transmit signal is delayed and sent on a first diversity channel and a nondelayed version of the signal sent on a second diversity channel. At the receiving site, first and second diversity channel signals are recovered and normalized into first and second constant-amplitude signals. Predominant components of the constant-amplitude signals are phase-and-amplitude aligned with each other by feedback loops including phase-and-amplitude alignment circuits, an adder and an AGC amplifier. The output of the AGC amplifier or the output of the subtracter is selected and applied to a matched filter to which a decision feedback equalizer is coupled. In a modified embodiment, the transmit signal from a single source is transmitted over multipath fading channels, resulting in the reception of first and second diversity channel signals which are normalized to constant-amplitude signals whose predominant components are then phase-and-amplitude aligned with each other through feedback loops including an AGC amplifier. Correlations between the predominant components in the first diversity channels and the output of the AGC amplifier are detected and multiplied with the output of the AGC amplifier, combined in respective subtracters with the diversity channel signals for coupling to respective matched filters whose outputs are diversity-combined together for coupling to a decision feedback equalizer. In a further modification, the output of the AGC amplifier is combined with the phase-and-amplitude aligned signals by the subtracters for coupling to the matched filters.

7 Claims, 5 Drawing Sheets

DIVERSITY RECEIVER USING MATCHED FILTER AND DECISION FEEDBACK EQUALIZER

BACKGROUND OF THE INVENTION

The present invention relates generally to digital radio communications systems with multipath fading channels, and more specifically to multipath fading diversity reception suitable for applications where deep fade occurs frequently.

Interference from frequency modulation sources can be treated as a narrow band signal if PSK or QAM digital microwave channels are designed to transport high speed signals. However, interference from other sources on multipath fading channels is treated as wide-band signals. For multipath fading channels in which deep fade occurs frequently, diversity reception and adaptive equalization are used as indispensable elements, and on long haul digital transmission routes such as out-of-sight transmission, the use of matched filters and decision feedback equalizers is known.

However, prior art diversity receivers are not capable of combining desired signals either at a maximum amplitude ratio or in an in-phase relationship during a deep fade in which interference simultaneously arises from an undesired source.

SUMMARY OF THE INVENTION

It is therefore an object of the present invention to provide space diversity reception capable of cancelling undesired signals without sacrificing desired components.

According to a first aspect of the present invention, there is provided a communications system comprising a transmitter for delaying a digital signal to produce a delayed version of the signal and transmitting the delayed version on a first carrier and transmitting a nondelayed version of the digital signal on a second carrier. The signals are transmitted on the tint and second diversity channels and respectively received at a receiving site as first and second diversity channel signals. First and second normalizing amplifiers produce first and second constant-amplitude signals from the first and second diversity channel signals, respectively. First and second phase alignment circuits are coupled to the first and second normalizing amplifiers, and an adder is provided to combine the outputs of the first and second phase alignment circuits. A third normalizing amplifier produces a third constant-amplitude signal from the output of the adder and applies It to the first and second phase alignment circuits as feedback signals. In this way, a dominant component of the first constant-amplitude signal is aligned in phase with a dominant component of the second constant-amplitude signal by the first and second phase alignment means. A subtracter is provided for combining the outputs of the first and second phase alignment circuits for coupling to the first input of a selector to the second input of which the output of the third normalizing amplifier Is applied. One of the signals applied to the selector is selected and applied to a matched filter whose output is coupled to a decision feedback equalizer.

According to a second aspect of the present invention, there is provided a diversity receiver for receiving replicas of a single carrier signal through multipath fading channels and recovering therefrom first and second diversity channel signals. The diversity receiver comprises first and second normalizing amplifiers for producing first and second constant-amplitude signals from the first and second diversity channel signals, respectively. First and second phase-and-amplitude alignment circuits are coupled to the first and second normalizing amplifiers, respectively. A first adder combines the outputs of the first and second phase-and-amplitude alignment circuits and applies the combined signal to a third normalizing amplifier for producing a third constant-amplitude signal, which is applied to the tint and second phase-and-amplitude alignment circuits as feedback signals, whereby dominant components of the first and second constant amplitude signals are aligned in phase with each other and adjusted in amplitude so that the outputs of the first and second phase-and-amplitude alignment circuits are combined at a maximum ratio by the first adder. First and second correlators are provided for respectively producing a first correlation signal representative of the correlation between the first diversity channel signal and the output of the third normalizing amplifier and a second correlation signal representative of the correlation between the second diversity channel signal and the output of the third normalizing amplifier. First and second multipliers respectively multiply the output of the third normalizing amplifier with the first and second correlation signals. First and second subtracters are provided for respectively subtracting the output of the first multiplier from the first diversity channel signal and subtracting the output of the second multiplier from the second diversity channel signal. First and second matched filters are respectively coupled to the outputs of the first and second subtracter means. A second adder, or diversity combiner combines the outputs of the first and second matched filters, and a decision feedback equalizer is coupled to the output of the diversity combiner.

According to a third aspect of the present invention, there is provided a diversity receiver for receiving signals through multipath fading channels and recovering therefrom first and second diversity channel signals, the receiver comprising first and second normalizing amplifiers for producing first and second constant-amplitude signals from the first and second diversity channel signals, respectively. First and second phase-and-amplitude alignment circuits are coupled to the first and second normalizing amplifiers, respectively. A first adder combines the outputs of the tint and second phase-and-amplitude alignment circuits. A third normalizing amplifier produces a third constant-amplitude signal from the output of the first adder and applies it to the first and second phase-and-amplitude alignment circuits as feedback signals, whereby dominant components of the first and second constant-amplitude signals are aligned in phase with each other and adjusted in amplitude so that the outputs of the first and second phase-and-amplitude alignment circuits are combined at a maximum ratio by the first adder, First and second subtracters subtract the output of the third normalizing amplifier from the outputs of the first and second phase-and-amplitude alignment circuits, respectively. First and second matched filters are coupled to the outputs of the first and second subtracters, respectively. A second adder, or diversity combiner combines the outputs of the first and second matched filters. A decision feedback equalizer is coupled to the output of the diversity combiner.

BRIEF DESCRIPTION OF THE DRAWINGS

The present invention will be described in further detail with reference to the accompanying drawings, in which.

DETAILED DESCRIPTION

Figure 1:
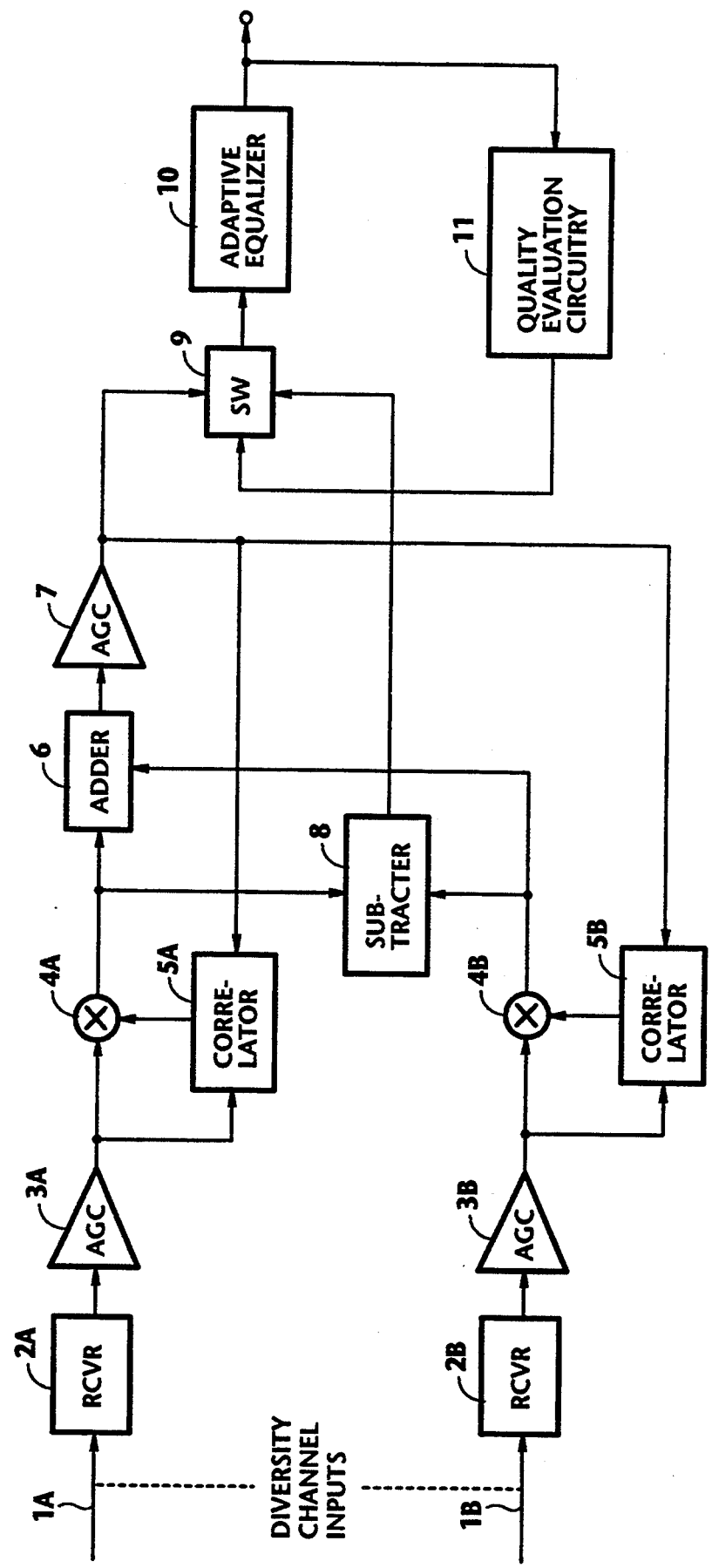
FIG. 1 is a block diagram of a prior art space diversity receiver.

Before going into the detail of the present invention, reference is first made to FIG. 1 to describe the prior art space diversity receiver in which wideband interfering signals occur on multipath fading channels. Microwave signals on multipath fading diversity channels 1A, 1B are converted to intermediate frequency signals by receivers 2A, 2B, amplified and normalized by AGC (automatic gain controlled) amplifiers 3A, 3B to minimize fluctuations caused by flat fading, multiplied by multipliers 4A, 4B with the outputs of correlators 5A, 5B, respectively, and combined by an adder 6. The output of adder 6 is normalized by an AGC amplifier 7 and fed to correlators 5A, 5B to detect correlations between the normalized signal and the outputs of amplifiers 3A, 3B. The outputs of multipliers 4A, 4B are summed by adder 6 and subtracted by a subtracter 8. The outputs of amplifier 7 and subtracter 8 are respectively applied to input terminals of a changeover switch 9. A quality evaluation circuit 11 is coupled to the output of an adaptive equalizer 10 for controlling the switch 9. In the absence of interference such as from a jamming source, switch 9 is in a position coupling the output of amplifier 7 to adaptive equalizer 10 in which waveform distortions caused by multipath fading are suppressed.

It the desired signal components are stronger than the jamming components, correlators 5A, 5B operate to align the amplitude and phase of each diversity channel with those of the other channel through the feedback AGC loops, so that the desired signals are combined at maximum ratio by adder 6 and coupled through switch 9 to adaptive equalizer 10.

Conversely, if jamming components are stronger than desired components, they are combined at maximum ratio by adder 6 through the feedback AGC loops and correlators 5A, 5B. These feedback operations align the amplitude and phase of the jamming components from each diversity channel (branch) which are cancelled out by subtracter 8. Desired signals are obtained at the output of subtracter 8 and coupled through switch 9 to equalizer 10. However, under such low D/U (desired to undesired) ratio situations, the desired signals are not combined at maximum ratio nor in an in-phase relationship, and therefore, satisfactory diversity combining cannot be obtained. Furthermore, if, in the case of such low D/U ratios, the desired and undesired signals of both diversity channels have an equal phase-and-amplitude relationship, they are aligned in phase and amplitude and completely cancelled out by subtracter 8.

Figure 2:
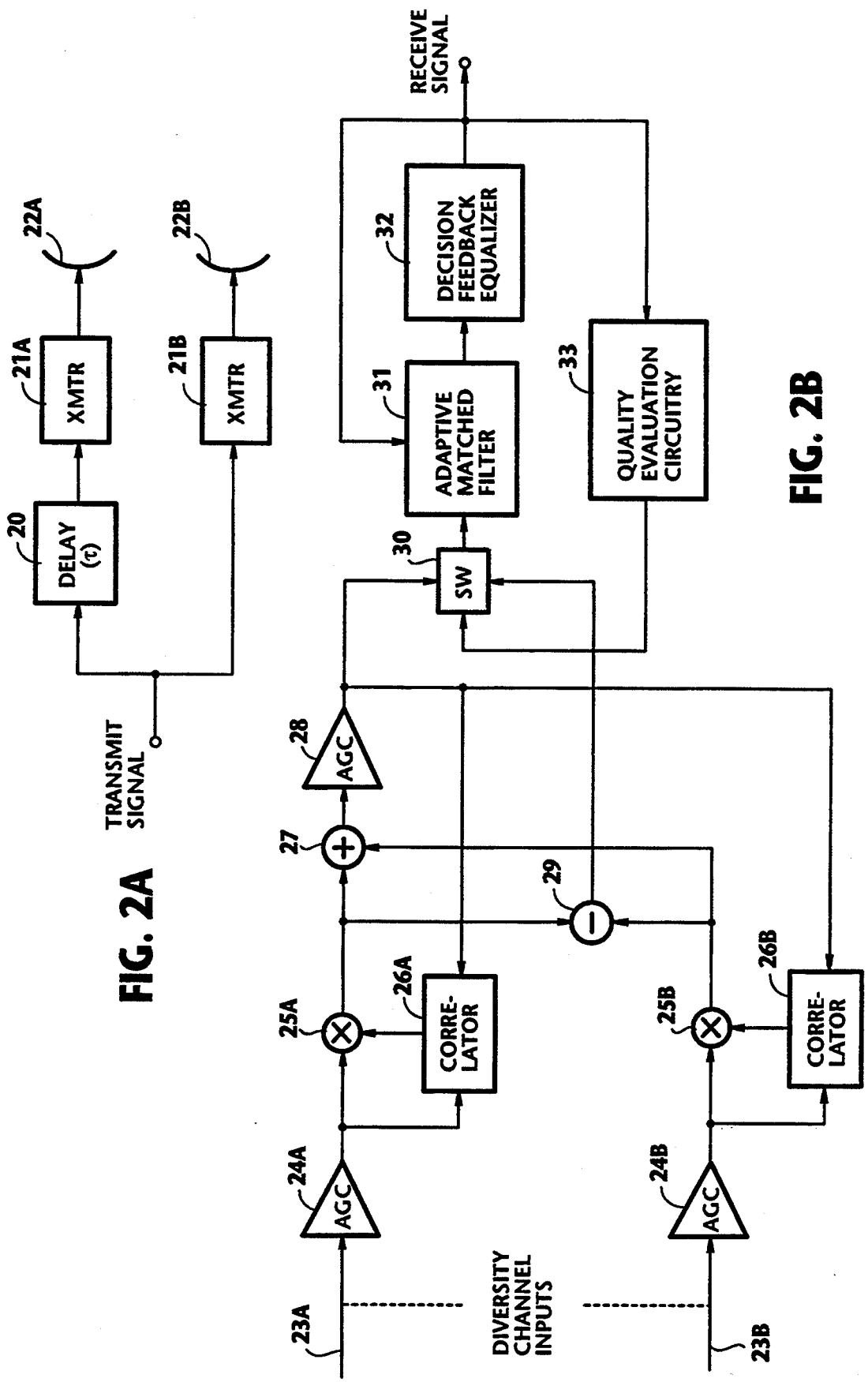
FIG. 2A is a block diagram of a delayed signal and non-delayed signal transmitter and FIG. 2B is a block diagram of a space diversity receiver according to a first embodiment of the present invention.

Referring now to FIGS. 2A and 2B, there is shown a diversity communications system according to a first embodiment of the present invention. At the transmitting site of the system, a transmit signal is branched into two paths, one comprising a delay line 20 and a transmitter 21A and the other comprising a transmitter 21B identical to transmitter 21A. Delay line 20 introduces a delay time $\tau$ which preferably corresponds to an integral multiple of a symbol interval T. The delayed version of the transmit signal is modulated upon a carrier by transmitter 21A and transmitted by a diversity antenna 22A on a first diversity channel, while the nondelayed version of the transmit signal is modulated upon the same frequency carder by transmitter 21B and transmitted by a diversity antenna 22B on a second diversity channel which is sufficiently spaced from antenna 22A.

At the receiving site of the system, the signal from antenna 22A is converted to an intermediate frequency and applied as a first diversity channel input 23A to AGC amplifier 24A and the signal from antenna 22B is converted to the same intermediate frequency and applied as a second diversity channel input 23B to AGC amplifier 24B. By automatic gain control, fluctuations of the diversity inputs due to flat fading are suppressed to a minimum and the amplitudes of the diversity inputs are normalized by amplifiers 24A and 24B. The outputs of amplifiers 24A, 24B are respectively supplied to multipliers 25A, 25B in which they are multiplied with complex-valued tap weight coefficients supplied from correlators 26A, 26B, and fed into adder 27 and subtracter 29. The output of adder 27 is normalized by AGC amplifier 28 and fed back to correlators 26A, 26B. The outputs of amplifier 28 and subtracter 29 are fed to inputs of a changeover switch 30. To the output of switch 30 is connected a matched filter 31 whose output is in turn connected to a decision feedback equalizer 32. Quality evaluation circuitry 33 is connected to the output of decision feedback equalizer 32 to control change over switch 30.

Figure 3:
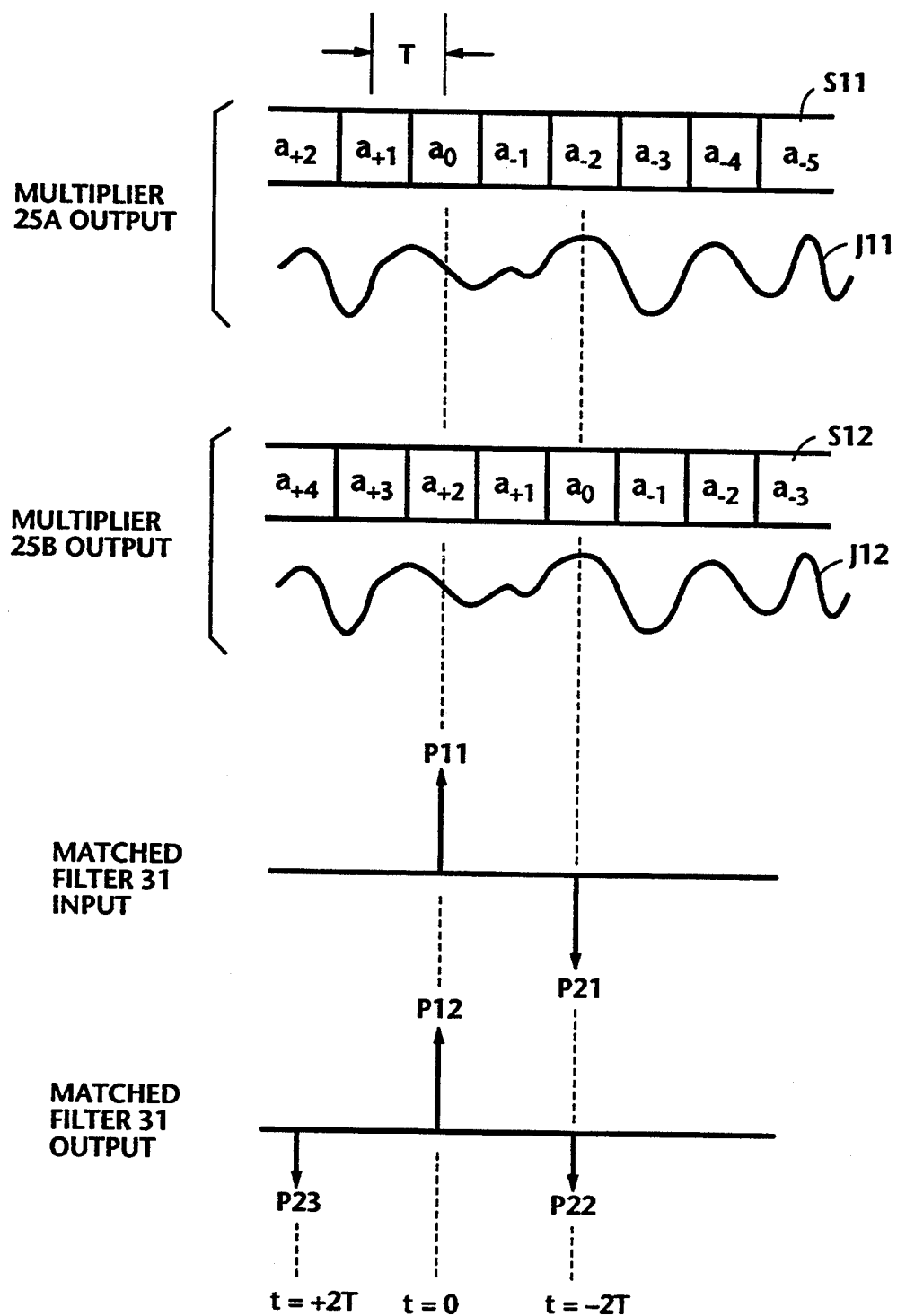
FIG. 3 is a waveform diagram associated with FIG. 2B.

The operation of the system will be described with reference to FIG. 3. Assume that the tint diversity signal is delayed by a two-symbol interval with respect to the second diversity signal. In the absence of a fade, switch 30 is in the upper position coupling the output of amplifier 28 to matched filter 31.

During a deep fade, switch 30 is moved to the lower position coupling the output of subtracter 29 to matched filter 31, and correlations are detected through feedback loops by correlators 26A, 26B between the predominant signals, i.e., jamming components J11 and J12 and the output of AGC amplifier 28. Due to the automatic-gain control of AGC amplifier 28, the jamming signals are the controlling factor of the feedback loops. They assume equal amplitudes and phase angles to each other at the outputs of multipliers 25A, 25B, and therefore, are cancelled out by subtracter 29. On the other hand, no cancellation occurs between desired components S11 and S12 because of the timing difference, even if the phase-and-amplitude relationship between signals S11 and J11 is equal to the corresponding relationship between signals S12 and J12. If the receiver is synchronized with the first diversity channel input 23A, the input of matched filter 31 for symbols $a_0$ can be represented by impulse responses P21 and P11 at times $t = -2T$ and $t = 0$, respectively. In such two-wave input sequences, matched filter 31 produces symmetrical impulse responses P22 at t=−2T, P12 at t=0 and P23 at t=+2T, as shown and described in K. Watanabe, "Adaptive Matched Filter And its Significance to Anti-Multipath Fading", *IEEE*, CH2314-3/86/0000-1455, 1986. It an be said that part of the signal energy is removed from Impulse response P11 to form impulse response P23 and the remaining energy of impulse response P11 is summed with part of the energy removed from impulse response P21. Thus, the energy at the Impulse responses for each incoming symbol is greater at reference time t=0 than at other times and the signal to noise ratio of the desired signal at the reference timing is increased to such a level that it can be easily equalized by decision feedback equalizer 32.

Figure 4:
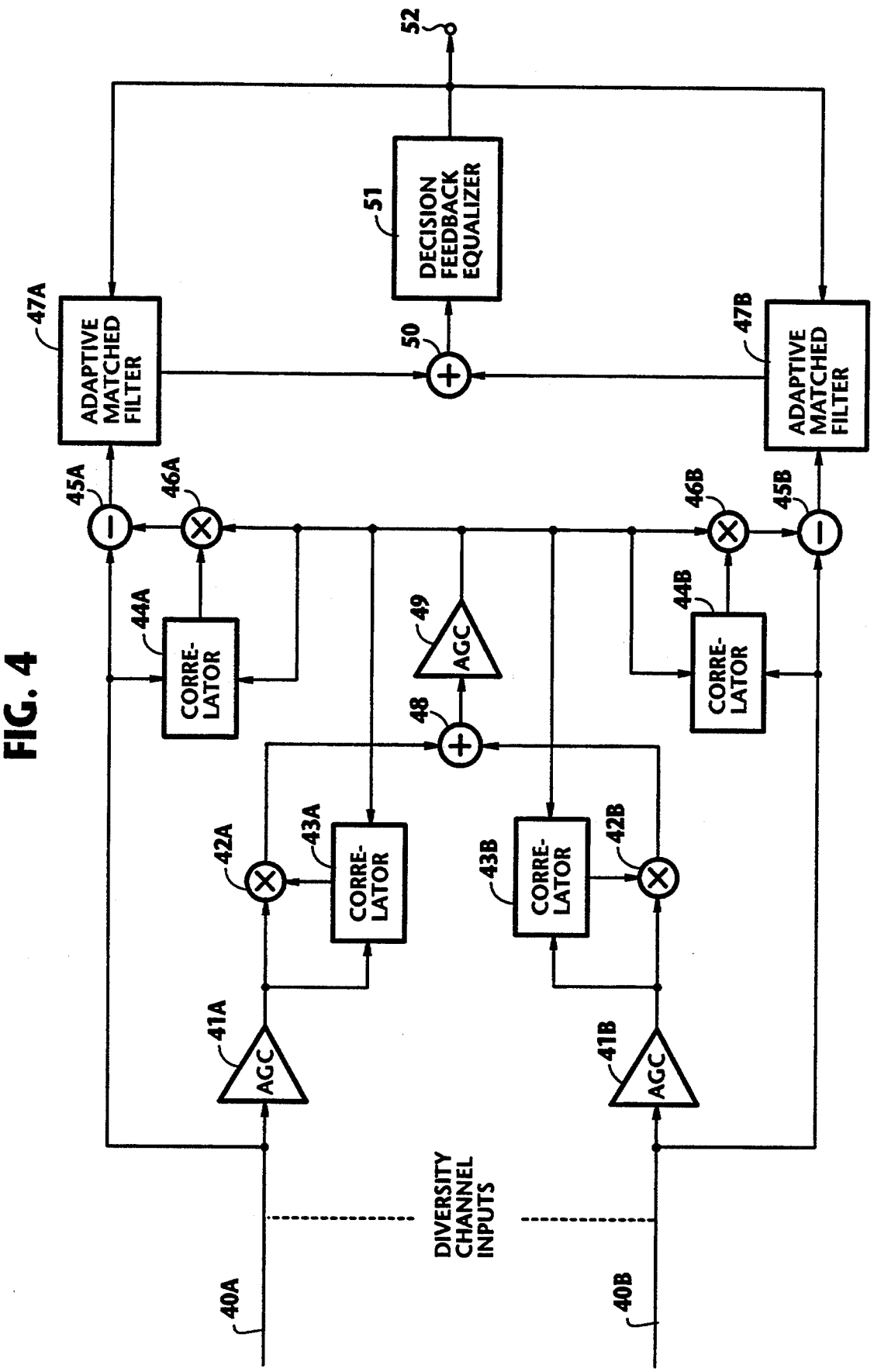
FIG. 4 is a block diagram of a space diversity receiver according to a second embodiment of this invention.

A second embodiment of this invention is shown in FIG. 4. In this embodiment, the transmitting site has a single antenna for transmitting only one signal over first and second multipath fading channels. At the receiving site, diversity channel inputs 40A and 40B, associated respectively with the fading channels, are fed to AGC amplifiers 41A, 41B in which they are normalized and fed into multipliers 42A, 42B, respectively, in which they are multiplied with complex-valued tap weight coefficients from correlators 43A, 43B. Each correlator includes a multiplier for correlating the applied signals in complex form and an integrator for averaging the correlations. The outputs of multipliers 42A, 42B are both combined by an adder 48 to produce a summed output, which is normalized by an AGC amplifier 49. The output of AGC amplifier 49 is fed back to correlator 43A so that the complex-valued tap weight coefficient represents the correlation between the normalized outputs from AGC amplifier 41A and 49. Likewise, the output of AGC amplifier 49 is fed back to correlator 43B so that its output represents the correlation between the outputs of AGC amplifiers 41B and 49. Through the AGC-correlation feedback loops, the dominant component of diversity channel 40A is aligned in phase and amplitude at the output of multiplier 42A with the dominant component of diversity channel 40B at the output of multiplier 42B.

The dominant signals at the outputs of multipliers 42A and 42B are combined by adder 48 at a maximum ratio and in an in-phase relationship and normalized by AGC amplifier 49 to the unit level which is equal to the signal level at the inputs of adder 48. In most instances, the weaker signals are combined by adder 48 at a less-than maximum ratio and in an out-of-phase relationship except for rare circumstances in which the phase-and-amplitude relationship between the desired and undesired signals of each diversity channel is the same as the corresponding relationship of the other channel, Thus, the amplitude of the combined weaker signal is compressed by AGC amplifier 49 with a compression ratio greater than the ratio with which the amplitude of the combined predominant signal is compressed during periods other than the worst-case situation. During a deep fade, weaker desired signals are thus compressed at the output of AGC amplifier 49 with a greater ratio than stronger jamming signals are compressed. In addition, it is seen that the ratio with which the combined weaker signal is compressed in relation to the predominant signals increases with diversity channels.

The output of AGC amplifier 49 is further applied to correlators 44A, 44B and multipliers 46A, 46B. The first and second diversity channel inputs are applied respectively to correlators 44A, 44B and to subtracters 45A, 45B. In this way, the correlation between the output of AGC amplifier 49 and the first diversity channel input 40A is detected by correlator 44A, and the correlation between the output of AGC amplifier 49 and the second diversity channel input 40B is detected by correlator 44B. The output of correlator 44A is a complex-valued tap weight coefficient and is applied to multiplier 46A in which it is multiplied with the output of AGC amplifier 49. Likewise, the complex-valued output of correlator 44B is applied to multiplier 46B in which it is multiplied with the output of AGC amplifier 49. The outputs of multipliers 46A and 46B are coupled to subtracters 45A and 45B, respectively to be subtracted with the respective diversity channel inputs.

By denoting the jamming components contained respectively in the first and second diversity channel inputs 40A, 40B as $J_1$ and $J_2$, respectively, and the normalized jamming component at the output of AGC amplifier as $J_r$, the following relations hold:

$$J_1 = A_1 \exp(j\phi_1) \cdot J \quad (1)$$

$$J_2 = A_2 \exp(j\phi_2) \cdot J \quad (2)$$

$$J_r = 1 \times \exp(j\phi_1) + \alpha(S_1 + S_2) \quad (3)$$

where $A_1 \exp(j\phi_1)$ and $A_2 \exp(j\phi_2)$ represent the transfer functions of first and second fading channels with respect to jamming signals, $S_1$ and $S_2$ are desired signals of the first and second fading channels, respectively, and $\alpha$ represents the compression ratio with which the amplitudes of the desired signals are compressed when jamming signals $J_1$ and $J_2$ are dominant.

Correlation $W_1$ detected by correlator 44A between $J_1$ and $J_r$ and correlation $W_2$ detected by correlator 44B between $J_2$ and $J_r$ are given as follows:

$$\begin{aligned} W_1 &= E[\{\exp(-j\phi_1) + \alpha(S_1^* + S_2^*)\} \cdot (S_1 + J_1)] \\ &= A_1 \cdot J + \Delta 1 \end{aligned} \quad (4)$$

$$\begin{aligned} W_2 &= E[\{\exp(-j\phi_1) + \alpha(S_1^* + S_2^*)\} \cdot (S_2 + J_2)] \\ &= A_2 \cdot \exp\{j(\phi_2 - \phi_1)\} J + \Delta 2 \end{aligned} \quad (5)$$

where, $\Delta 1$ represents the correlation between the desired signal contained in the normalized component $J_r$ and the desired component of the first diversity input, and $\Delta 2$ represents the correlation between the desired signal in the normalized component $J_r$ and the desired component of the second diversity input. Since the desired components in the normalized signal $J_r$ are smaller than the jamming components, the correlations $\Delta 1$ and $\Delta 2$ can be ignored.

Multipliers 46A and 46B multiply the normalized component $J_r$ with the correlation weighting coefficients $W_1$ and $W_2$ to produce weighted outputs which approximate the jamming components $J_1$ and $J_2$, respectively. The outputs of multipliers 46A, 46B are supplied as estimates of interference to subtracters 45A and 45B in which they are subtracted from the diversity channel inputs 40A and 40B, respectively, with the result that jamming components $J_1$ and $J_2$ are cancelled out. Desired components $W_1 \cdot \alpha(S_1 + S_2)$ and $W_2 \cdot \alpha(S_1 + S_2)$ contained in the multiplier outputs are also subtracted from the desired components of the first and second diversity channel inputs. Since these desired components correspond to the correlation-derived components $\Delta 1$ and $\Delta 2$ mentioned above, the outputs of subtracters 45A and 45B can be used as a replica of the desired signals even though the receiver encounters a worst-state situation in which the phase-and-amplitude relationship between $S_1$ and $J_1$ and the corresponding relationship between $S_2$ and $J_2$ are equal to each other.

The outputs of subtracters 45A and 45B are fed into adaptive matched filters 47A and 47B, respectively, to which feedback timing signals are supplied from a decision feedback equalizer 51 to deliver its output to an output terminal 52. The outputs of matched filters 47A, 47B are combined by an adder 50, which serves as a diversity combiner. The output of the diversity combiner 50 is applied as an input signal to derision feedback equalizer 51.

In the matched filters, the input signals from the associated subtracters 45 are delayed successively along taps at symbol intervals, multiplied with the feedback timing signals and integrated over the symbol interval to produce phase-aligned matched filter outputs for each incoming symbol. In this way, signals, which may be randomly dispersed on a time axis, can be aligned in phase by matched filters 47A, 47B. Therefore, the output of diversity combiner 50 has such an amplitude that it can be easily equalized and intersymbol interference is eliminated by decision feedback equalizer 51.

Figure 5:
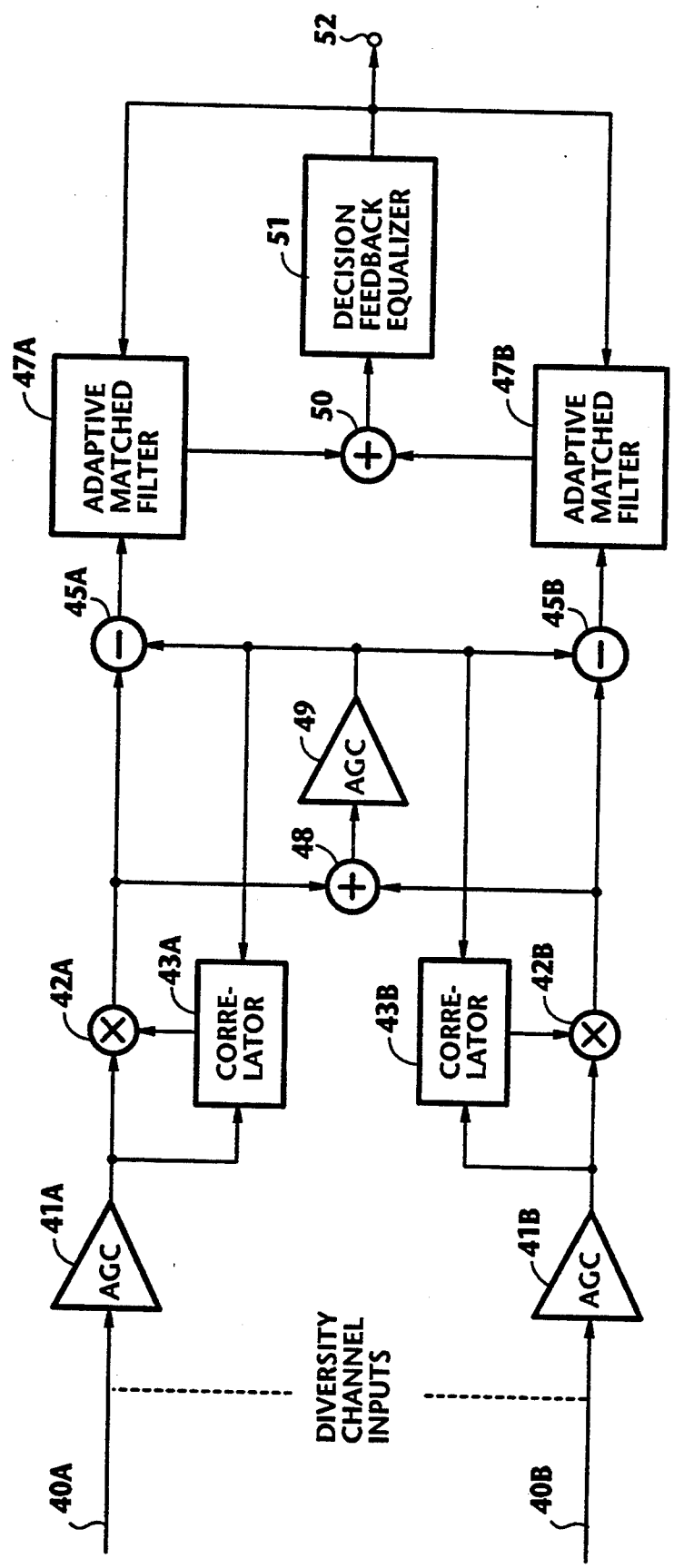
FIG. 5 is a block diagram of a space diversity receiver according to a modified embodiment of this invention.

The second embodiment of this invention can be simplified as shown in FIG. 5 for use in applications where the worst-state situation occurs very seldom and hence it can be ignored. This embodiment differs from the second embodiment in that it dispenses with correlators 44A, 44B and multipliers 46A, 46B, while subtracters 45A and 45B take input signals from the outputs of multipliers 42A and 42B, respectively.

During a deep-fade situation, the dominant jamming signals at the outputs of multipliers 42A and 42B are combined by adder 48 at a maximum ratio as well as in an in-phase relationship and normalized by AGC amplifier 49 to a level substantially equal to the level at the inputs of adder 48. The weaker desired signals are combined by adder 48 at a less-than maximum ratio as well as in an out-of-phase relationship. The amplitude of the combined desired signal is compressed by AGC amplifier 49 with a compression ratio greater than the ratio with which the amplitude of the combined jamming signal is compressed. Therefore, the stronger jamming signals are combined in subtracters 45A, 45B at a maximum ratio in an opposite phase relationship so that they are cancelled completely, while the combined desired signal at the output of AGC amplifier 49 has a lower amplitude than the desired components at the outputs of multipliers 42A, 42B. Therefore, the desired signals are combined by subtracters 45A and 45B at a less-than maximum ratio and in an out-of-phase relationship, causing desired signals of a sufficient level to appear at the inputs of adaptive matched filters 46, 47A, 47B.

As in the second embodiment, the ratio with which the combined weaker signal is compressed by AGC amplifier 49 in relation to the predominant signals increases proportionally as a function of the number of diversity channels.

The foregoing description shows only preferred embodiments of the present invention. Various modifications are apparent to those skilled in the art without departing from the scope of the present invention which Is only limited by the appended claims. Therefore, the embodiments shown and described are only illustrative, not restrictive.

What is claimed is:

1. A radio communications system comprising:
    transmitter means for delaying a digital signal to produce a delayed version of the digital signal and transmitting the delayed version on a first diversity channel and transmitting a nondelayed version of the digital signal on a second diversity channel;
    first and second receiver means associated respectively with the first and second diversity channels for generating first and second diversity channel signals;
    first and second normalizing amplifier means coupled respectively to the first and second receiver means for respectively producing first and second constant-amplitude signals from the first and second diversity channel signals;
    first and second phase alignment means coupled to the first and second normalizing amplifier means, respectively;
    adder means for combining output signals from the first and second phase alignment means;
    third normalizing amplifier means for producing a third constant-amplitude signal from an output signal of the adder means and applying the third constant-amplitude signal to the first and second phase alignment means, whereby dominant components of the first and second constant-amplitude signals are combined at a maximum ratio by the adder means;
    subtracter means for combining output signals from the first and second phase alignment means;
    selector means for selecting a signal from the output of the third normalizing amplifier means or from the output of the subtracter means in response to a command signal applied thereto;
    matched filter means coupled to the output of the selector means; and
    decision feedback equalizer means coupled to the output of the matched filter means; and
    evaluation means for producing the command signal depending on an output signal from the decision feedback equalizer means.

2. A radio communications system as claimed in claim 1, wherein the delayed version of the digital signal is delayed with respect to the nondelayed version by an amount corresponding to an integral multiple of a symbol interval.

3. A radio communications system as claimed in claim 1, wherein the first phase alignment means comprises a first correlator for producing a first correlation signal representative of a correlation between the outputs of the first and third normalizing amplifier means and a first multiplier for multiplying the output of the first normalizing amplifier means with the first correlation signal, and wherein the second phase alignment means comprises a second correlator for producing a second correlation signal representative of a correlation between the outputs of the second and third normalizing amplifier means and a second multiplier for multiplying the output of the second normalizing amplifier means with the second correlation signal.

4. A diversity receiver for receiving signals through multipath fading channels and recovering therefrom first and second diversity channel signals, comprising:
    first and second normalizing amplifier means for producing first and second constant-amplitude signals from the first and second diversity channel signals, respectively;

first and second phase-and-amplitude alignment means coupled to the first and second normalizing amplifier means, respectively;

first adder means for combining output signals from the first and second phase-and-amplitude alignment means;

third normalizing amplifier means for producing a third constant-amplitude signal from an output signal of the first adder means and applying the third constant-amplitude signal to the first and second phase-and-amplitude alignment means, whereby dominant components of the first and second constant-amplitude signals are combined at a maximum ratio by the first adder means;

first and second correlator means for respectively producing a first correlation signal representative of the correlation between the first diversity channel signal and the output of the third normalizing amplifier means and a second correlation signal representative of the correlation between the second diversity channel signal and the output of the third normalizing amplifier means;

first and second multiplier means for respectively multiplying the output of the third normalizing amplifier means with the first and second correlation signals;

first and second subtracter means for respectively combining the output of the first multiplier means with the first diversity channel signal, and combining the output of the second multiplier means with the second diversity channel signal;

first and second matched filter means coupled to the outputs of the first and second subtracter means, respectively;

second adder means for combining output signals of the first and second matched filter means; and decision feedback equalizer means coupled to the output of the second adder means.

5. A diversity receiver as claimed in claim 4, wherein the first phase-and-amplitude alignment means comprises a third correlator for producing a third correlation signal representative of the correlation between the outputs of the first and third normalizing amplifier means and a third multiplier for multiplying the output of the tint normalizing amplifier means with the third correlation signal, and wherein the second phase-and-amplitude alignment means comprises a fourth correlator for producing a fourth correlation signal representative of the correlation between the outputs of the second and third normalizing amplifier means and a fourth multiplier for multiplying the output of the second normalizing amplifier means with the fourth correlation signal.

6. A diversity receiver for receiving signals through multipath fading channels and recovering therefrom first and second diversity channel signals, comprising:

first and second normalizing amplifier means for producing first and second constant-amplitude signals from the first and second diversity channel signals, respectively;

first and second phase-and-amplitude alignment means coupled to the first and second normalizing amplifier means, respectively;

first adder means for combining output signals from the first and second phase-and-amplitude alignment means;

third normalizing amplifier means for producing a third constant-amplitude signal from an output signal of the first adder means and applying the third constant-amplitude signal to the first and second phase-and-amplitude alignment means, whereby dominant components of the first and second constant-amplitude signals are combined at a maximum ratio by the first adder means;

first and second subtracter means for combining the output of the third normalizing amplifier means with the outputs of the first and second phase-and-amplitude alignment means, respectively;

first and second matched filter means coupled to the outputs of the first and second subtracter means, respectively;

second adder means for combining output signals of the first and second matched filter means; and decision feedback equalizer means coupled to the output of the second adder means.

7. A diversity receiver as claimed in claim 6, wherein the first phase-and-amplitude alignment means comprises a correlator for producing a first correlation signal representative of a correlation between the outputs of the first and third normalizing amplifier means and a first multiplier for multiplying the output d the first normalizing amplifier means with the first correlation signal, and wherein the second phase-and-amplitude alignment means comprises a second correlator for producing a second correlation signal representative of a correlation between the output of the second and third normalizing amplifier means and a second multiplier for multiplying the output of the second normalizing amplifier means with the second correlation signal.

* * * * *